3,555,132
PROCESS FOR FORMING GELATIN-FORM-
ALDEHYDE FOAMS
Calvin J. Benning, Clarksville, Md., assignor to W. R.
Grace & Co., a corporation of Connecticut
No Drawing. Continuation of application Ser. No.
729,936, May 17, 1968. This application June 16,
1969, Ser. No. 837,997
Int. Cl. B29d 27/04
U.S. Cl. 264—50                        2 Claims

ABSTRACT OF THE DISCLOSURE

A process for producing an aldehyde-hardened gelatin by adding 4 to 24 parts of aldehyde/100 parts gelatin to a solution of 50% by weight gelatin in water, beating the solution into a foam which is shaped to a desired configuration and then simultaneously heating and drying the foam at temperatures between 125 and 200° F. The drying may be carried out at less than 130° F. while the wet foam is packed in powdered diatomaceous earth.

---

This invention relates to the manufacture of foams based on gelatin and a crosslinking agent.

Foams have many uses which range from thermal insulation to shock-absorbing packings. Particularly when insulation is involved, stiff, rigid foams have high utility.

I have discovered that the hard, insoluble reaction product of gelatin and formaldehyde or its equivalents, if it is whipped into a foam and then dried, produces an extraordinary packing and insulating material which, although having densities of, e.g. 4 and 5 lbs. p.c.f., is so strong that it will exhibit a strength at yield in the order of 134 p.s.i.

The foams, however, dry very reluctantly. The skinning of hard-surface film which is formed as soon as the gelatin is exposed to drying conditions, holds back the transfer of water vapor to the ambient air and makes drying exasperatingly slow. However, the strength exhibited by foams of such extraordinarily low density makes them valuable products where weight saving is paramount.

The foams may be produced in conventional apparatus such as a baker's "whip" in which a wire whisk is both rotated, and travels in a circular path. In this instance, the speed with which the whisk rotates, in considerable measure, controls the diameter of the air bubbles introduced into the mass. The foam is molded into desired shapes by being scraped into a mold. After the foam has assumed a definite shape, it is removed from the mold and dried. Drying, e.g. in a current of rapidly circulating hot air, will produce substantial distortion or shrinkage of the foam shape, but drying in saturated atmospheres, although it requires a long time interval, will ultimately produce a stiff, rigid foam which, when it is exposed to the normal atmospheres, stabilizes with a relatively low moisture content.

A convenient method of drying the foamed hardened gelatin is to bury the foam in a fine powder, and place the pack in a well-ventilated chamber maintained at a mild (less than 130° F.) temperature. Hardwood sawdust or ground corn cobs work well. So also do a variety of inorganic materials such as commercial filtration media and fuller's earth. The powder packing, although permeable to water vapor, retards the movement of the vapor and maintains a sufficient concentration against the gelatin surface so that the skin, which otherwise prevents the transfer of water vapor across the gelatin/air interface, does not form—or at least remains water vapor permeable.

The time which is required to dry a block of foam is highly variable. It depends upon the thicknesss of the foam sample, the size of the pores in the foam, and the effectiveness of the removal of water vapor from the drying chamber. Generally speaking, foams of approximately ½ inch thickness, if maintained in a drying chamber wherein the humidity is progressively dropped from saturation to approximately zero levels, will be dried to contain no more than 10% moisture in from 70 to about 100 hours.

There are, however, certain instances where closed-pore foams are not necessary, but foams having open pores, i.e. interconnected so that air may pass freely from void to void, will be found strong enough to make good protective or shock-absorbing packing material. I have discovered that such foams may be made by adding commercial wetting agents to the gelatin solution prior to the addition of the hardening agent.

These foams may be dried in a conventional hot-air oven maintained at mild temperatures not over 130° F. and little shrinkage will be experienced.

EXAMPLE 1

500 ml. of 250 g. of gelatin in water is heated to 130° F. and then is whipped into a voluminous froth. 15 cc. of a 37% aqueous solution of formaldehyde is then added slowly while vigorous mixing (with a mechanically driven whip) is continued. Crosslinking takes place almost immediately. Placing the foam in the mold must be done at once. The foam is removed from the mold as a tough, cellular, rubber-like substance. This product is placed in an oven maintained at 150° F. to remove the water. It dries slowly and reluctantly even though the air in the oven be circulated. At the end of three days, approximately 50 g. of water remains in the sample. A major difficulty with such foams is the slow rate of drying.

COMPREHENSIVE STRENHTH VS. PERCENT COMPRESSION

| Conditions | Percent compression | Compression strength (p.s.i.) |
|---|---|---|
| 0% R.H. | 3.301 | [1] 134.0 |
| | 5 | 127.1 |
| | 10 | 132.2 |
| | 25 | 107.2 |
| 50% R.H. | 3.131 | [1] 103.2 |
| | 5 | 99.84 |
| | 10 | 96.17 |
| | 25 | 97.43 |

[1] Yield.

EXAMPLE 2

A foam made in accord with Example 1 is removed from its mold and packed in a box containing fine hardwood sawdust. The maximum cross-section of the foam is ½ inch. With the box placed in an oven maintained at 130° F. with strong ventilation, the foam will be found to contain less than 10% of water at the end of 100 hours. The stress at yield of the above sample is approximately 135 p.s.i.

EXAMPLE 3

500 ml. of aqueous solution containing 250 g. gelatin is heated to 130° F. 10 g. of paraformaldehyde is added to the hot solution and the whole is immediately whipped into a froth. The resulting foam is easier to work than the foam of Example 1. However, it is weaker in the wet state. The foam becomes strong and hard after curing in an air oven maintained at 200° F. for 24 hours.

EXAMPLE 4

A foam is produced according to the procedure set forth in Example 2. After the foam is removed from the mold, it is placed in a container and covered with a diatomaceous earth filter medium (Celite, Johns-Manville Company), so that more than 1 inch of material overlays each part of the foam. The foam is reduced to less than 10% water content after drying for 100 hours at 125° F.

EXAMPLE 5

A solution containing 250 ml. of water and 125 g. of gelatin is heated to 130° F. To this is added 30 g. of trioxymethylene and 10 cc. of a commercial wetting agent, 66 EP (Procter & Gamble). The solution, still at 130° F. is whipped into a froth. The resulting foam is open cell, i.e. the cells are interconnected. It dries satisfactorily in an oven maintained at 150° F. in approximately 6 hours. The size of the cells in the above foam is subject to adjustment by changing the concentration of the wetting agent, and the amount of entrained air introduced in the whipping step.

The densities of the open-cell foams are approximately equal to foams having closed cells, but in most instances open-cell foams, although they will collapse under a heavy blow more easily than will close-cell foams, will be found to be effective packaging materials and offer protection to small parts packed in the foam sufficient to withstand the handling in ordinary transportation.

Although closed-cell foams require long drying times, packing in powder and drying is a simple and inexpensive approximation of saturated atmosphere drying. Strong, very low density foams can, consequently, be made at low cost.

Open-cell foams, strong enough to be useful, can also be made very cheaply, for no special drying apparatus is required.

I claim:
1. The process of making foams formed from gelatin and an aldehyde selected from the class consisting of formaldehyde, paraformaldehyde, and trioxymethylene consisting of the steps of:
(a) adding 4 to 24 parts of said aldehyde/100 parts gelatin to a solution of 50% by weight of gelatin in water to insolubilize the gelatin,
(b) beating the wetted solution into a foam,
(c) shaping the foam by placing it in a mold,
(d) removing the shaped foam from the mold and
(e) simultaneously heating and drying the foam at temperatures between 125 and 200° F.

2. The process of claim 1 wherein the said foam, subsequent to its removal from said mold is packed in finely powdered diatomaceous earth and dried at less than 130° F. while still packed in said diatomaceous earth for a time sufficient to reduce the water content of said foam to approximately 10%.

References Cited

UNITED STATES PATENTS

| 3,288,729 | 11/1966 | Waterman | 264—50X |
| 1,247,284 | 11/1917 | Krüger | 34—9 |
| 2,000,042 | 5/1935 | Sheppard et al. | 264—321X |
| 2,465,357 | 3/1949 | Correll | 264—50X |
| 2,876,085 | 3/1959 | Horie | 51—296 |

FOREIGN PATENTS

| 145,559 | 5/1949 | Australia | 264—50 |
| 12,046 | 3/1916 | Great Britain | 34—9 |
| 76,844 | 1950 | Norway | 264—50 |

JULIUS FROME, Primary Examiner

P. A. LEIPOLD, Assistant Examiner

U.S. Cl. X.R.

34—9; 260—2.5, 117; 264—321